(12) United States Patent
Cukierman et al.

(10) Patent No.: US 7,379,928 B2
(45) Date of Patent: May 27, 2008

(54) METHOD AND SYSTEM FOR SEARCHING WITHIN ANNOTATED COMPUTER DOCUMENTS

(75) Inventors: Ryan E. Cukierman, Redmond, WA (US); Vikram Madan, Bellevue, WA (US); Gregory H. Manto, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 784 days.

(21) Appl. No.: 10/367,198

(22) Filed: Feb. 13, 2003

(65) Prior Publication Data

US 2004/0161150 A1 Aug. 19, 2004

(51) Int. Cl.
*G06F 17/30* (2006.01)
(52) U.S. Cl. .................................. 707/3; 707/4; 707/5
(58) Field of Classification Search .................... 707/3, 707/4, 5
See application file for complete search history.

(56) References Cited

U.S. PATENT DOCUMENTS 6,766,494 B1 *  7/2004  Price et al. ................. 715/513
6,785,417 B1 *  8/2004  Williamson et al. ........ 382/186
2002/0165873 A1 * 11/2002  Kwok et al. ................ 707/500
2004/0120582 A1 *  6/2004  Sarkar ......................... 382/228

OTHER PUBLICATIONS

Aviezri S. Fraenkel and Shmuel T.Klein; Information Retrieval from Annotated Texts; Sep. 9, 1998; The Weizmann Institute of Science in Rehovot, Israel and Dept. of Math. & CS of Bar Ilan University in Ramat-Gan 52900, Israel; pp. 1-29.*

* cited by examiner

*Primary Examiner*—Etienne Leroux
*Assistant Examiner*—Monica M Pyo
(74) *Attorney, Agent, or Firm*—Workman Nydegger (57) ABSTRACT

A method and system for searching digitally annotated computer documents, including searching the annotations. An annotated document may be open for viewing by a user, or alternatively present among closed files that are searched to find files that match a query. In one implementation, the document data and the ink-annotation data exist on two separate layers, with each layer having associated text content, whether as original text or as annotations that are recognized as text. When a user issues a query to search the annotated document, the query is passed to a search engine that performs the pattern matching on the text in each layer, to produce search results. The search engine may produce a search result data structure for each match, which may be sorted with other data structures into a list, such as sorted by pages and coordinates, to present them to a user in a logical ordering.

27 Claims, 10 Drawing Sheets

FIG. 13

METHOD AND SYSTEM FOR SEARCHING WITHIN ANNOTATED COMPUTER DOCUMENTS

FIELD OF THE INVENTION

The present invention relates generally to methods and systems on computer devices, and more particularly to computer devices arranged to receive handwritten input.

BACKGROUND OF THE INVENTION

Paper has traditionally been the most convenient way to read and annotate documents, especially when a user annotates in natural handwriting, using a pen. Today, however, contemporary computing devices allow users to enter handwriting, such as by writing on the screen of a tablet or hand-held personal computer. Based on the technology that allows digital ink to be entered into a computer, computer applications have been developed that allow a user to annotate computer documents with digital ink annotations. As tablet and other handwriting-capable personal computers become more prevalent, traditional paper and pen-based annotating likely will become less common.

Current digital ink annotations are very similar to ink annotations on paper, comprising independent "mark-ups" or drawings, in which each annotation is treated as a singular entity whose positioning relative to the underlying document is preserved, maintained, and displayed, but whose content and/or meaning is disconnected from the document itself. As a result, any interpretation of the meaning of the annotation is left to the user's own cognition, even though the digital ink annotation may be as valuable as or even more valuable than the content within the annotated computer document.

One of the primary advantages of computer documents over paper documents is that users can conveniently and rapidly search for specific information within a computer-based document in ways that are not possible on paper documents. This has been done for a long time with text documents. However, because most computer applications treat digital annotations essentially as drawings, users do not have the ability to electronically search through the annotations added to computer documents. What is needed is a way to search computer documents that have been annotated with electronic ink, including searching the annotations.

SUMMARY OF THE INVENTION

Briefly, the present invention provides a system and method for searching digitally annotated computer documents. The system and method allow the user to uniformly and seamlessly search the digitally annotated computer document, in a manner that equivalently searches both the computer document content and the digitally inked annotation content. The annotated document may be searched while open for viewing by a user, or while in a closed file that is searched along with other files to find files that match a query.

In one implementation, the document data and the ink-annotation data conceptually exist on two separate layers, which the viewing program displays simultaneously, superimposed one on top of the other. Each layer has associated text content, which in the document layer is the text that was in the original document. In the ink annotation layer, the text content is derived by parsing the ink annotations and performing handwriting recognition on the ink annotations. The recognition may be performed in advance or on an as needed basis.

When the user issues a query to search the annotated document, the query is passed to a core search engine that contains pattern-matching heuristics. The search engine performs the pattern matching on the text in each layer, one layer at a time, to find search matches, and produce search results. So that the same search engine can be used, the document and ink-annotation layers are provided to the search engine through interfaces that provide a text stream to the search engine, regardless of the whether the text originated in the document layer or in the ink annotation layer. For closed documents, the search engine can return a search status result (e.g., found or not found) for each document that is searched.

For open documents, each time the search engine finds a successful match, the search engine produces a search result data structure, which is added to a list of any other matches in the document. Each search result data structure is tagged with or contains metadata that may specify, among other things, the layer in which the match occurred, the page number of the document where the text exists, the spatial coordinates of the match, a bounding box of the match, pointers or handles to the corresponding document, text words or annotations, ink strokes, and so forth.

Once the entire document, including the recognized annotations, has been processed by the search engine, the list of the search result data structures is collated and reordered as necessary by a sorting mechanism into some logical order. For example, the sorting mechanism may order the data structures by page number first, then by y-coordinates on the page, then by x-coordinates (within sets having similar y-coordinates) to produce a logically sorted list in which the matching search terms or phrases are generally in the order that they appear in the annotated document. Moreover, note that the sorting can add intelligent heuristics or the like to better match what a user intended based on other known data, e.g., timing data, z-ordering, author and so forth. With the sorted list, the system can rapidly highlight instances of the search term or phrase as the user interacts with the document, by walking up or down the ordered data structure list to quickly find data for the next or previous instance in the document.

Other advantages will become apparent from the following detailed description when taken in conjunction with the drawings, in which:

DETAILED DESCRIPTION

Exemplary Operating Environment

Figure 1:
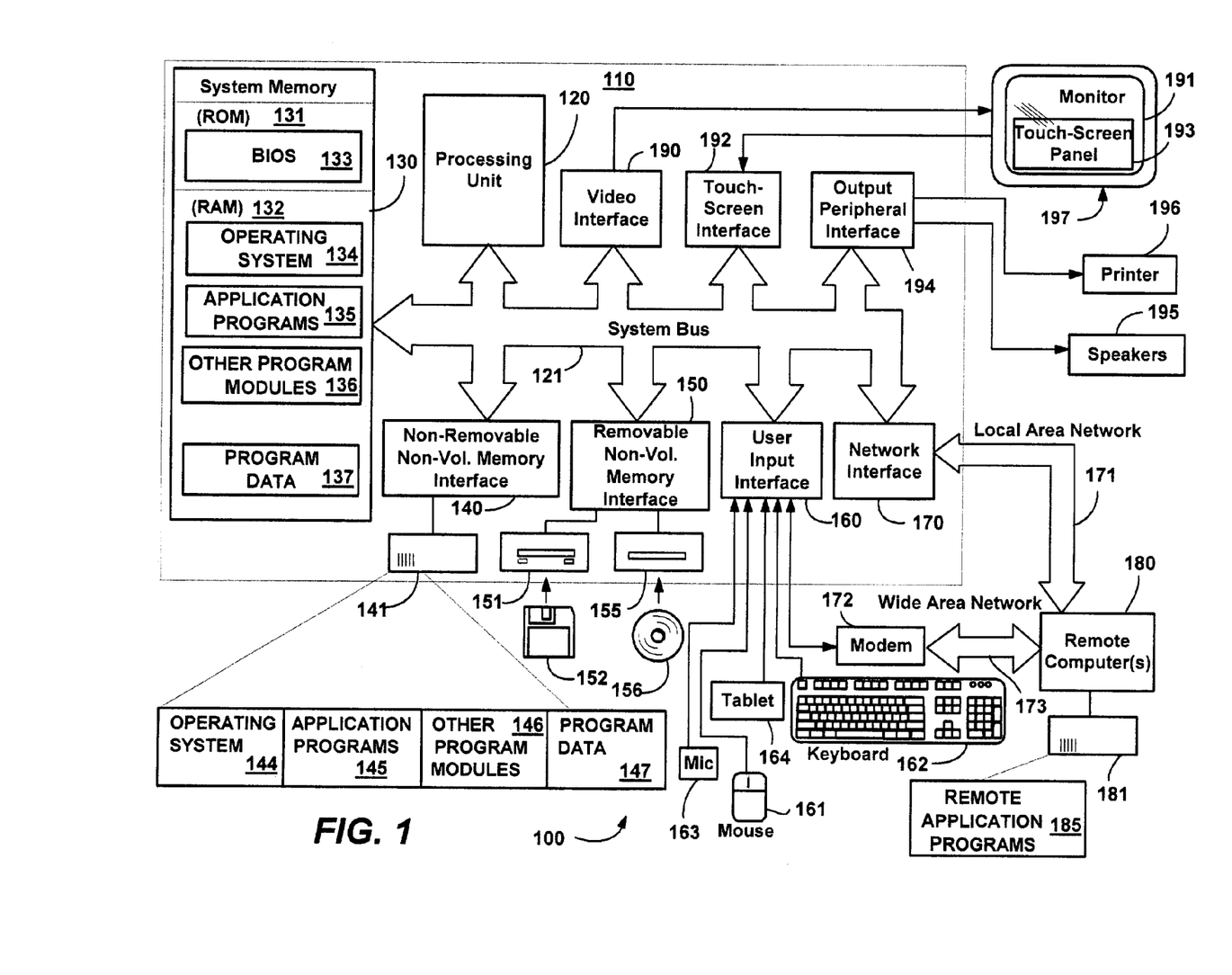
FIG. 1 is a block diagram representing one exemplary computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet (electronic digitizer) 164, a microphone 163, a keyboard 162 and pointing device 161, commonly referred to as mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel 193 (e.g., forming a touch-sensitive display 197) or the like that can input digitized input such as handwriting into the computer system 110 via an interface, such as a touch-screen interface 192. Note that the monitor and/or touch screen panel can be physically coupled to a housing in which the computing device 110 is incorporated, such as in a tablet-type personal computer, wherein the touch screen panel 193 essentially serves as the tablet 164. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Searching Annotations

The present invention provides a system and method for searching an annotated computer document, including the annotations as well as the text, in a manner that is seamless, as if the written annotations are part of the original document. Note that the present invention is directed to an underlying content layer on which at least one annotation layer (and possibly other types of layers) have been added, and for simplicity is primarily described herein with respect to handwritten annotations added to a text-based content document. Notwithstanding, it should be understood that searching in accordance with the present invention may also be performed on text annotations added to a text document and/or text annotations added to a digital ink-based content document, as well as digital ink and/or text annotations added to a digital ink document. As will be understood, the present invention works when combinations of digital ink and text are present, whether present as annotations, as underlying content, or both.

In general, the seamless searching of the present invention is accomplished by having any ink annotations recognized as text, (whether the recognition is current or was previously performed), performing a search on the text (recognized from handwriting if necessary) of the underlying content document, performing a search on the annotations, and then, if needed, sorting the search results into an order that matches the order that the annotations and text appear to the user. While one search engine described herein is one that matches characters in an "exact" match or "fuzzy" type of match, (described below), it will be understood that the search need not be limited to character-based searches. For example, a search can be by date and/or time, so that only annotations made at a particular meeting will be found to match. These two concepts may be combined, e.g., only annotations made at a particular meeting that also match a certain query (word or phrase) will be considered a match.

The present invention thus allows a user or program (such as a component that searches one or more folders for matching files) to search a digitally annotated computer document, such that the user is presented with a single homogenous set of matching search results, or a program is provided with a match status for a given file. The query is applied to both the document's original text and the (recognized) digital ink or text annotations. Note that if any digital ink, whether original content and/or an annotation was not previously recognized, handwriting recognition may first be applied to the digital ink in order to have converted text to compare in the search.

When a user is searching through an opened, displayed document, the matching results from this query are collated and correlated, and are then presented to the user in a logical order, such as the order in which the user might see the annotations while traversing the annotated document from start to finish. The user thus has a consistent experience of being able to seamlessly find information of interest across the computer document and its associated text or digital ink annotations.

Figure 2:
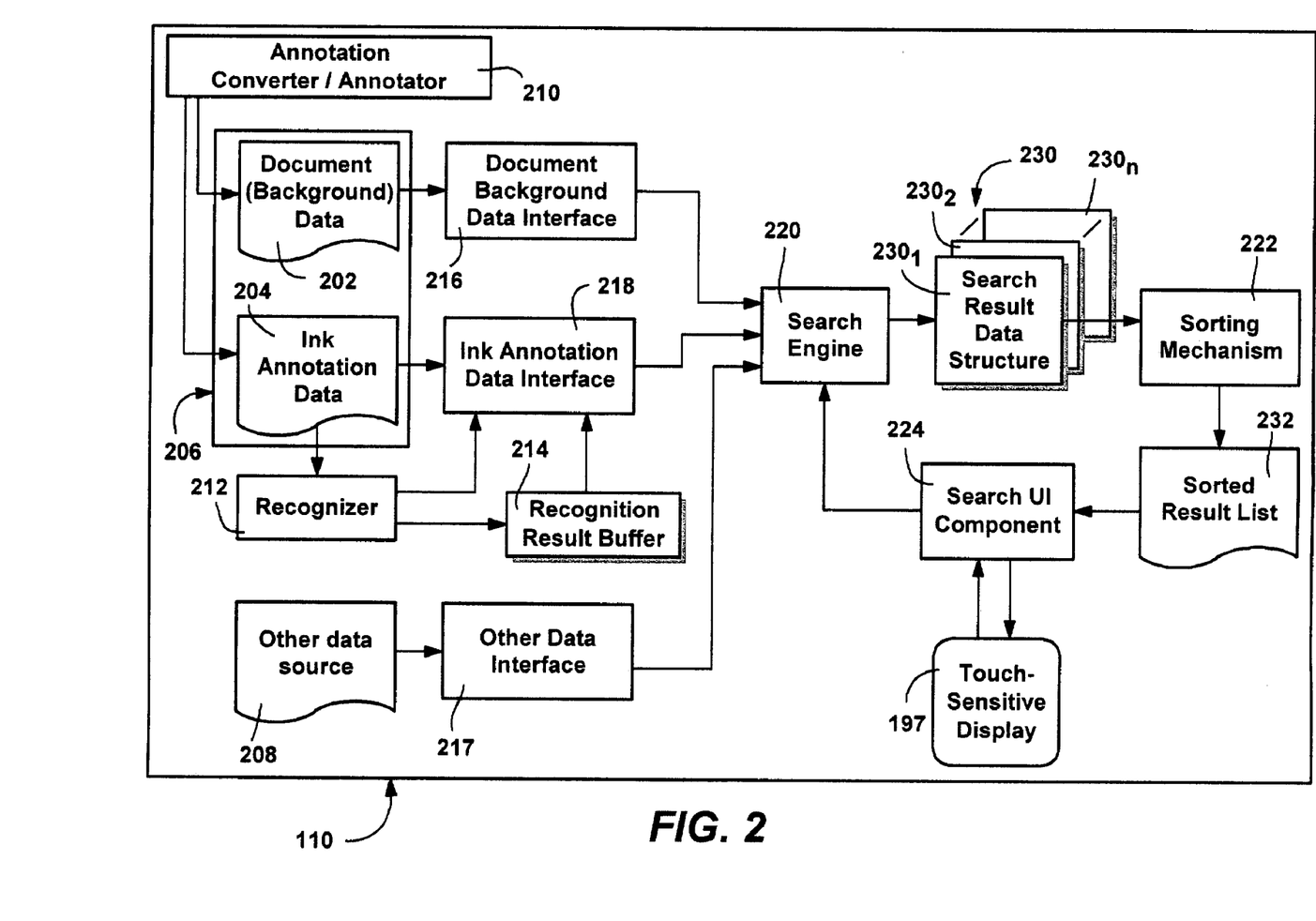
FIG. 2 is a block diagram generally representing components and data structures for searching and sorting search results of annotations in accordance with an aspect of the present invention.

FIG. 2 is a representation of components suitable for implementing various aspects of the present invention. In FIG. 2, the computer system has document data 202, ink annotation data 204, such as in a file 206, and possibly other source data 208. In one example implementation, the text of a document of virtually any format may be converted to a document format (e.g., a Windows® Journal document) that can be marked up with annotations, such as via a corresponding annotation application program 210 (e.g., Windows® Journal) or operating system component. Following conversion, the text of such converted documents is retained in the document data 202, and is searchable similar to text in any other application.

For simplicity, the present invention will be primarily described with respect to a user that is viewing an open, annotated document, in which the annotations have been recognized as text. However, the present invention also applies to programs, such as a file searching program that reads the document content as part of a search for matching files with query criteria (whereby each file's contents ordinarily would not be displayed). In other words, the present invention applies to both open and closed documents. In a described implementation, the annotation and recognition may have been performed in the user's computer as generally represented in FIG. 2, wherein the converter/annotator 210 and recognizer 212 are present, with the recognition results buffered (e.g., in a memory cache so as to avoid having to repeatedly perform recognition) 214. It should be understood, however, that one or both of the annotation and/or recognition operations may be performed elsewhere, e.g., on a different computing device. For example, the document data 202 and ink annotation data 204 in the file 206 may have been created on another computer system and received in any number of ways, e.g., via removable media or over a network connection. Similarly, recognition also may have been performed external to the computer system, with the recognized text maintained as part of (or linked to) the file 206, e.g., appended to it, in which event the data can be read from the file rather than from a recognition result buffer 214. In fact, the present invention may be implemented on a computer system with no recognition capabilities. Further, some or all of the components represented herein can be combined, or further separated. For example, the converter/annotator 210, interfaces 216-218, search engine 220, sorting mechanism 222 and search UI component 224 can be combined into a single annotation application program or operating system component/package.

Within the file 206, the document data 202 and the ink-annotation data 204 conceptually exist on two separate layers, which the viewing program (e.g., in the annotation program 210) displays simultaneously, superimposed one on top of the other. As a result, from the user's perspective, there is only one file and one document surface displayed, on which both the document text and the ink annotations appear to co-exist, similar to actual ink on a paper document.

Each layer has an associated text content, which in the case of the document layer, is essentially the text and/or recognized handwriting that was in the original document. In the annotation layer, the text may be derived by parsing any ink annotations and performing handwriting recognition on those ink annotations. As mentioned above, the recognition results can be buffered for efficiency, and/or also added to the file 206 (e.g., and considered part of the ink annotation data 204), whereby the recognition results may be persisted with the file 206. As a result, recognition need only be performed once, which may have been done external to the computer system 110.

In accordance with an aspect of the present invention, when the user issues a query to search the annotated document, such as via a search user interface (UI) 224, the query is passed to the core search engine 220 that contains pattern-matching heuristics, as described below.

The search engine 220 performs the pattern matching on the text in each layer, one layer at a time, to find search matches and produce search results. Note that if the file is being searched by a file searching mechanism, and a single match is sufficient to meet the query, then the search results comprise a found status or a not found status. To facilitate searching, the document and ink-annotation layers are shimmed through one or more intermediate internal interfaces 216-218 such that the data to-be-searched looks substantially identical (in format) to the search engine 220, e.g., as a text stream, whereby the search is conducted in the same way on the text regardless of the whether the text originated in the document layer or in the ink annotation layer. In this way, content from the document and the annotations are searched equally. Note that instead of searching both, the user may optionally elect to search through only the computer document's original text content, or search through only the digital ink annotation content. Further note that other layers are feasible, such as annotations from other users and/or made at different times being treated as a separate layer.

In accordance with an aspect of the present invention, in one implementation, each time that the search engine 220 finds a successful match on a document that the user has opened for viewing (and possibly editing), the search engine produces a search result data structure (e.g., $230_2$), which is added to a list 230 of any other matches (e.g., $230_1$) in the document. Each search result data structure $230_1$-$230_n$ is tagged with metadata that specifies, among other things, the layer in which the match occurred, the page number of the document where the text exists, the spatial coordinates of the match, a bounding box of the match, pointers or handles to the corresponding document, text words or annotations, ink strokes, and so forth. The following table is one suitable data structure for maintaining this information:

```
// SearchResult
//
// @class SearchResult is a class to represent what is needed to
// identify a singe search result.
class SearchResult{
public:
    DWORD      stSearchType;   // The type of search
    DWORD      srfFields;      // The fields that are set in the
                               // SearchResult Structure.
    CString    sPath;          // path of file where result was found,
                               // NULL for current note.
    CComPtr<IInkLayerSpecifierSet>  spRISS;  // the specifier set
                               // describing the result if in a certain
                               // format (e.g., a richink format).
    int        iPage;          // The page of the document the result is in
    CRect      rcBounds;       // These are the bounds of the result on
                               // the page indicated by iPage.
    int        iSpanStart;     // The word number on the page
                               // it was found.
    int        iSpanSize;      // The number of words in the span.
    SearchResult( ) {                              // Constructor.
        stSearchType = ST_INVALID;
        srfFields = SRF_NONE;
        spRISS = NULL;
        iPage = 0;
        iSpanStart = -1;
        iSpanSize = 0;
    }
    ~SearchResult( ) {                             //Destructor.
    }
    // @cmember A function used by qsort to compare two search results.
    static int __cdecl CompareSearchResults(const void * elem1, const
void * elem2);
    // @cmember Is the laguage left to right reading.
    static BOOL  bLeftToRight ;
    // @cmember Is the language top to bottom flowing.
    static BOOL  bTopToBottom;
    // @cmember The difference in document units by which the y axis
    // must differ for two results to be considered on different lines.
    static int        iLineJitter;
};
```

Once the entire document, including the recognized annotations, has been processed by the search engine 220, the list 230 of the search result data structures $230_1$-$230_n$ is collated and reordered (as necessary) by a sorting mechanism 222 into some logically ordered list 232. The list 232 then may be walked backwards or forwards, as results are desired. For example, the sorting mechanism 222 may order the data structures by page number first, then by y-coordinates on the page, then by x-coordinates (within sets having similar y-coordinates) to produce a logically sorted list that is sorted by the upper left value of the bounding box, which generally corresponds to the order in which the matching terms or phrases appear in the document being viewed. Note that the actual y-coordinates may be grouped into sets of y-coordinate ranges, e.g., so that the annotations' bounding boxes generally align as the user most likely intended. For example, if (the absolute value of) the difference in two y-coordinates is below a certain threshold, those y-coordinates are grouped together and the bounding boxes considered to be on the same line. Note that this threshold difference may be configurable, so that, for example, users who write large characters may set a different difference threshold than users who write small characters.

Moreover, note that the sorting can add intelligent heuristics or the like to better match the order that the annotator or annotators intended. For example, timing information is available, and thus may be used to determine when a user wrote a sequence of words. The sort may then employ the timing information as well as coordinate data. For example, a user may annotate in the right or left margin in a generally upward direction, whereby coordinate sorting may not get the ordering right. The timing information, along with possibly an indication by a recognizer that the characters were in an upward direction, may be used instead of coordinates in the sorting operation, so that words would appear to be found in the order they were written, instead of by where they are on the page. Essentially, any metadata that is available or can be derived from the document or annotation may be used as criteria in the search and/or sort, including time, z-ordering, author and so forth.

Moreover, the list 232 may be used to generate an index or otherwise displayed, at least in part. For example, the user can see a view of each instance where the word appears, with some surrounding context, whereby the user can quickly select and navigate to an instance, remove erroneous matches from the list, and so on.

Figure 3:
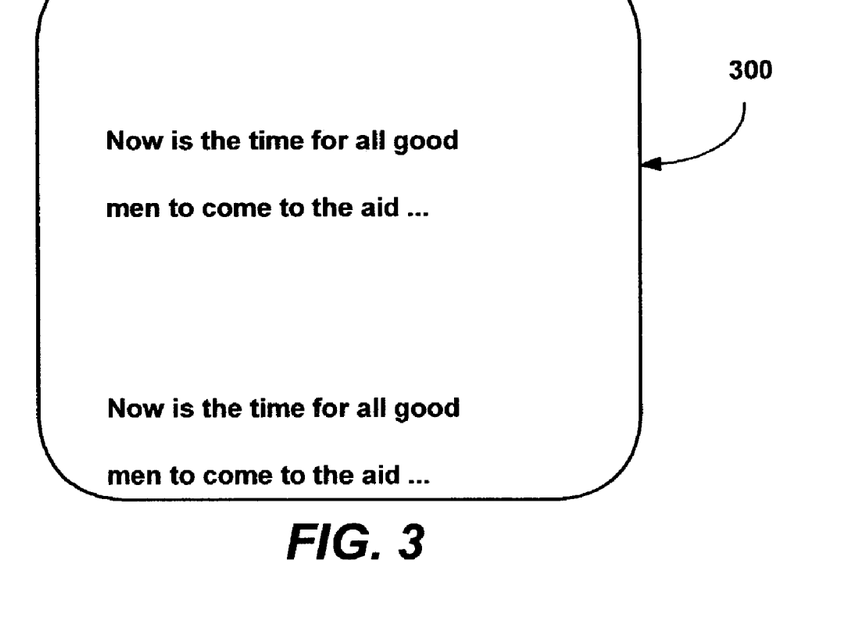
FIGS. 3-8 are representations of an annotated document as matches are found for a user by walking a sorted list of matches in accordance with an aspect of the present invention.
Figure 4:
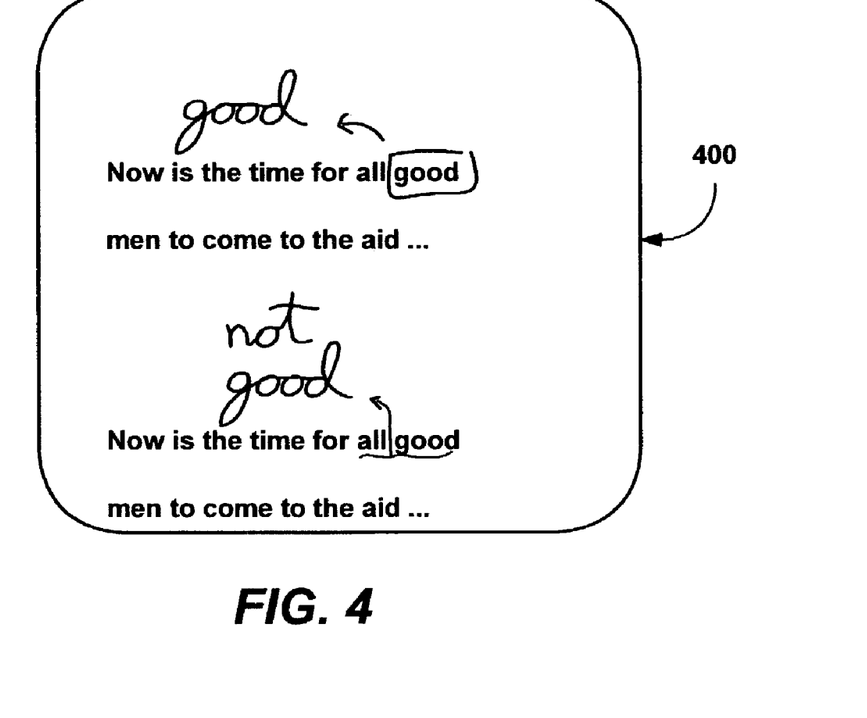
Figure 5:
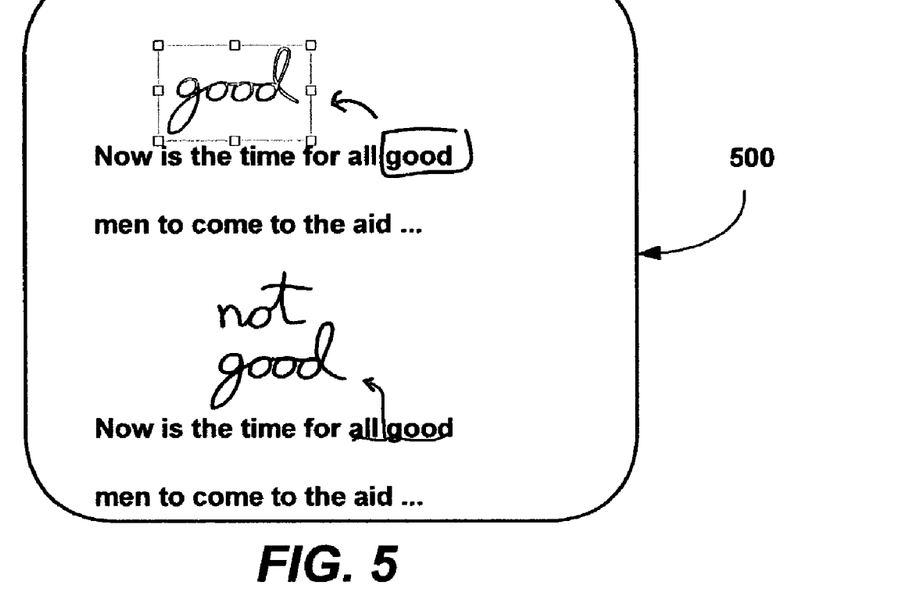
Figure 6:
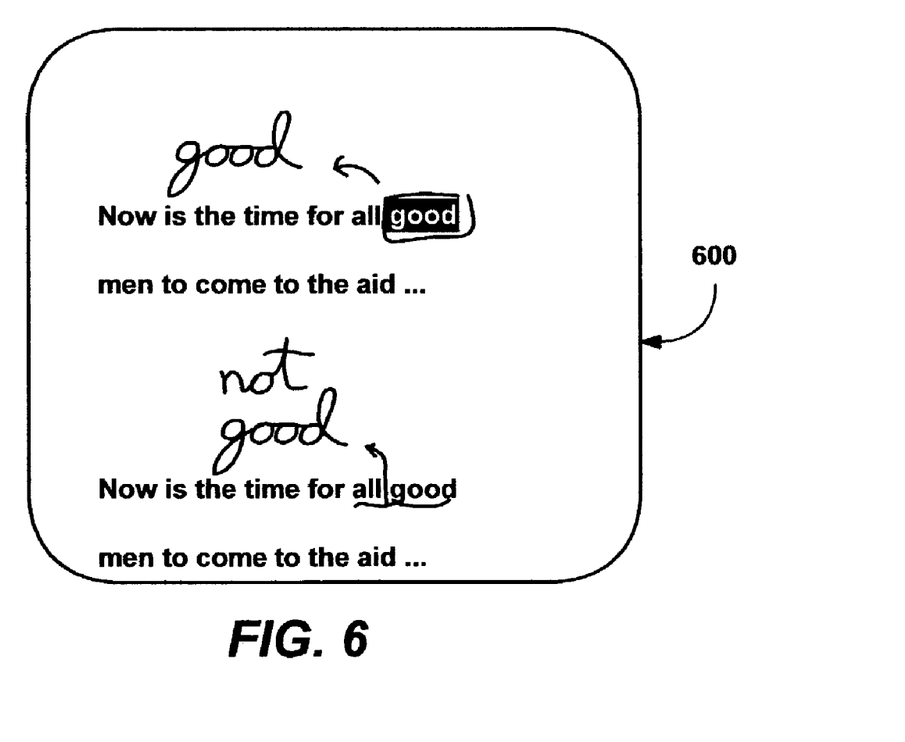
Figure 7:
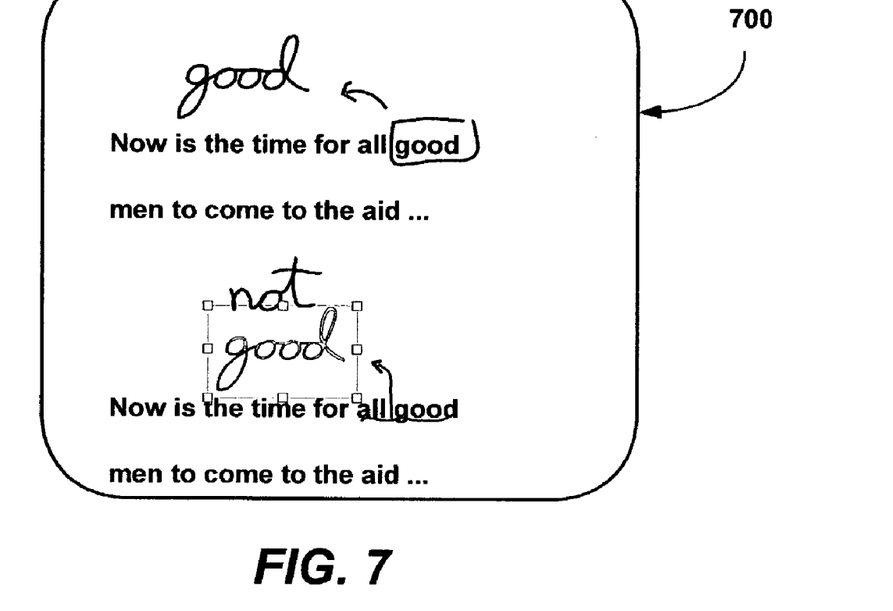
Figure 8:
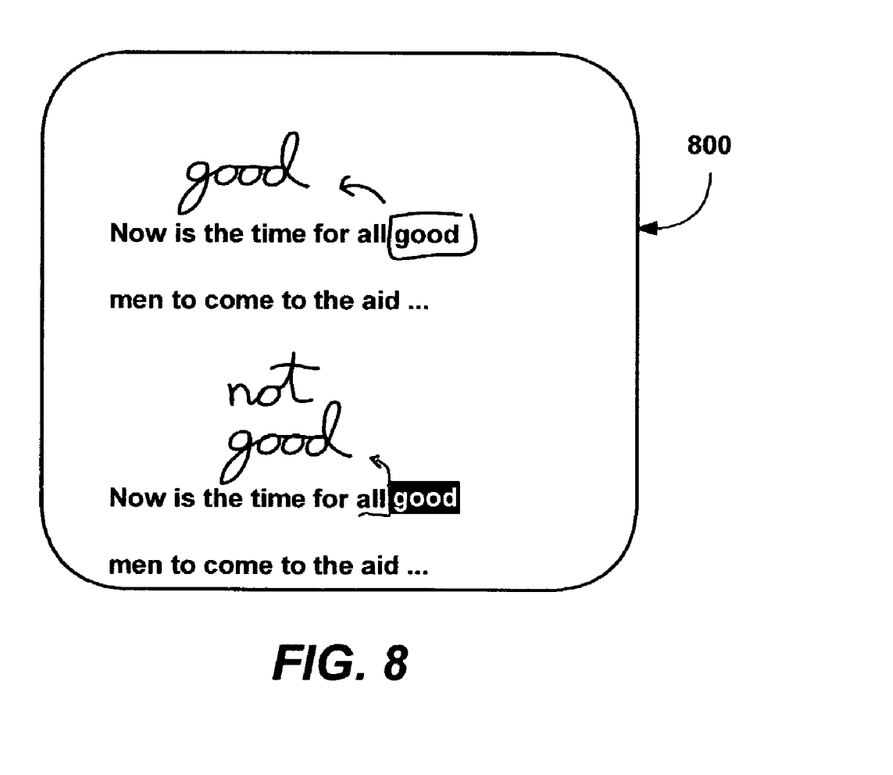

As represented in FIGS. 3-8, the search results are then presented to the user in this logical order, thereby providing the user with a consistent user experience in navigating search results within the document and the annotations. By way of example, consider the displayed page in a text document 300, as represented in FIG. 3, which is marked up with annotations into an annotated document 400 as represented in FIG. 4. When a user requests a search on the term "good" in this example, which may be entered by typing or recognition (e.g., by writing the word or drawing a box around it, and requesting a search), the first instance of good that is found on the page is the handwritten one, as shown in the representation 500 of FIG. 5, wherein the ink is highlighted in some way to indicate the found word. The " Find Next" or similar search command will change the highlighting to the text, where "good" is highlighted in some way such as represented in the displayed document 600 of FIG. 6. FIGS. 7 and 8 show the results in document display instances 700 and 800, respectively, when the "Find Next" search command is repeated twice more.

Figure 9:
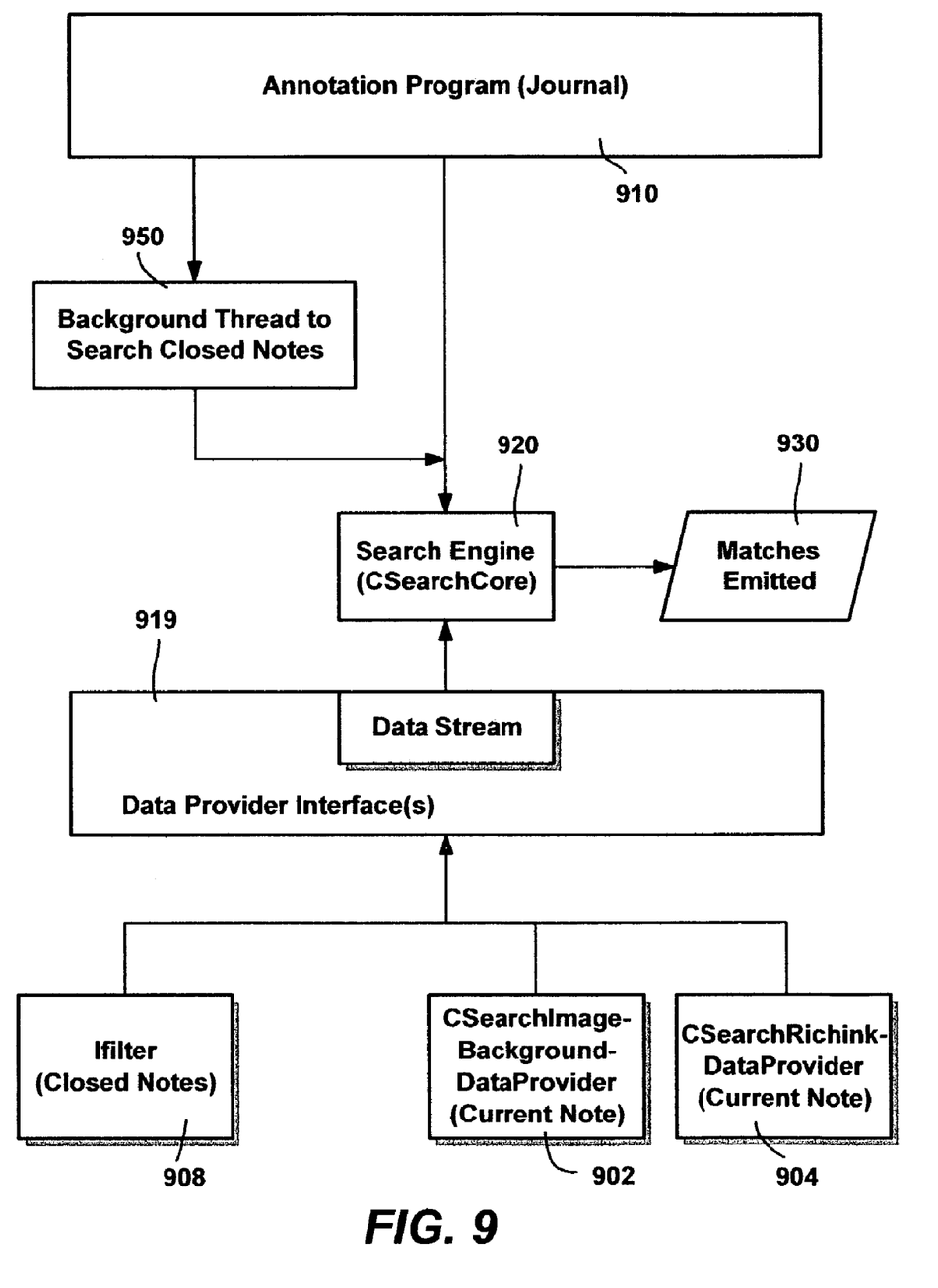
FIG. 9 is a block diagram generally representing components and data structures in an example implementation for searching and sorting search results of annotated documents in accordance with an aspect of the present invention.

FIG. 9 represents one example implementation, wherein in order to provide a consistent experience and re-use as much code as possible, the text matching done for each type of data is performed by an object class, CSrchCore, as the search engine 920. In the case of closed note (file) searches, the search engine object 920 is normally instantiated (for performance reasons) in a background thread 950, while for open note searches, the program 910 may create the search engine object directly on the program's UI thread. The search engine 920 gets the raw text stream from any data class via the data provider interfaces 919 (in SearchDataProviderCallbacks, described below). This allows the search engine 920 to get text from multiple different sources 902, 904 and 908. The search engine 920 then iterates through the words in the data stream, and uses the criteria with which search engine 920 was initialized with to determine if any of the text matches, as described below. If the search engine 920 finds a match, an output function (OnNewResult) is called.

The search engine 920 performs the actual comparisons to determine if any of the words in a given text stream match the query. After search engine 920 is instantiated, an "init" function is called, which initializes the search engine 920 with several structures:

| | |
|---|---|
| lpcwsQuery | The query string the user is looking for. |
| stSearchType | Flags modifying the search, such as fuzzy search, or include other document data. |
| ProviderCalllbacks | The mechanism by which the search core gets the functions to call in order to get data from the provider, e.g., GetNextWord |
| CallerCallbacks | Callbacks to notify the caller when the search is done. Also a notification when results are found. |

Figure 10:
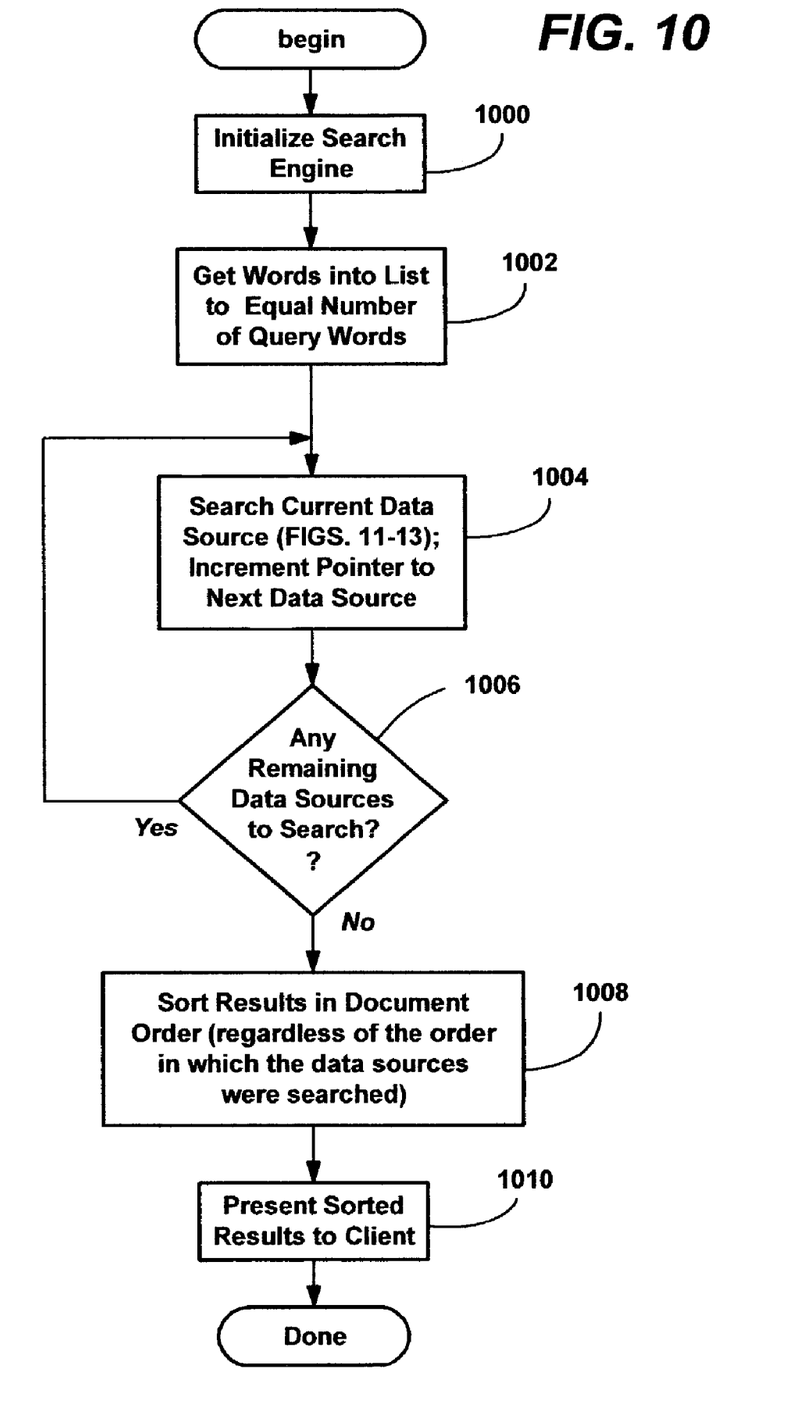
FIG. 10 is a flow diagram generally representing the logic for searching an annotated document in layers in accordance with an aspect of the present invention.

Such initialization is represented in the flow diagram of FIG. 10 by step 1000. Following initialization, the search is started by calling a Start() function, which begins by calling GetNextWord() on a data provider to construct a circular list of one or more words. After parsing the query it then calls GetNextWord() enough times to have the same number of words in memory as in the query, as represented by step 1002; note that as described below, the search engine 920 may use the locale of the first word (or some representative words) to determine how to parse the query. Once there are enough words in the circular list, the search engine 920 iterates through the data sources in the loop shown via steps 1004 and 1006.

While searching for text, the search engine 920 uses a data provider (via an interface) to get the target text stream to match the search string against. The data provider may be initialized by the same code which created the search engine 920 object. In one implementation, the search engine 920 will only call a GetNextWord function on the data provider, to retrieve the text stream, as the data provider is expected to remember what the last word emitted was. The data provider returns an end of data status when the end of the document is reached.

At present, in the example implementation, there are three data providers currently used by journal, including CSearchRichinkDataProvider (ink layer provider) or the like, which is used to give data on the document currently open in journal. This provider is initialized with a document pointer, and with the pointer the data provider is able to create a page enumerator. For each page, the data provider creates a recognition-related object for an entire page, and the words in the recognition object are returned one at a time, e.g., by a GetNextWord function. When the entire page is done being searched, the next page is loaded, until the end of data status is returned, as detected at step 1006.

The CSearchImageBackgroundDataProvider works in a similar method to the ink layer provider RichinkDataProvider, and returns recognized content of the background image of the current note being searched. This is accomplished by creating a WORD_LIST for the document, e.g., a list of recognized words obtainable via a _GetWordList function, and walking the list.

The CSearchIFilterDataProvider allows multiple clients (e.g., an index server that automatically builds indexes, sps) to search annotated document files (e.g., a journal note file, or .JNT file). To this end, an IFilter reads the text from .JNT files, which is a standard index server method of reading the text from a file. However, when the IFilter 908 is not the same as the DataProvider inferface, a CSearchIFilterDataProvider wraps the IFilter to make it look like a DataProvider. Note that the JNTFiltr encodes its data in an XML steam, which is retrieved and then parsed. The stream contains the data about the word, including locale data.

The JNTFiltr comprises the IFilter 908, which opens the annotated document (.JNT file) and emits the data in chunks. If the client is not the journal program 910, the filter strips out the XML stream, and returns only the primary alternates. More particularly, the recognizer (e.g., 212 of FIG. 2) may have returned alternates information corresponding to recognized word or words for the ink passed thereto, and these may also be searched in a fuzzy search, at least in part, or stripped out so that only the primary alternate is searched. In general, the alternates information comprises a list of alternate word choices, or simply alternates (sometimes referred to as candidates), for each word recognized by the recognizer for a given set of handwriting data passed thereto. The alternates may be ranked and/or grouped/classified in accordance with probability of correctness, and/or probability information associated with each alternate may be returned in the alternates information. For example, a list of alternates may be returned with a highest ranked alternate having a sixty percent probability, the next ranked alternate with a ten percent probability, and so on. The number of returned alternates may be limited to some fixed amount, and/or alternates with very low probabilities may be left off the list. Note that the probability information may be returned on a logarithmic scale instead of in terms of a percentage value. One suitable recognizer is described in U.S. Pat. Nos. 5,313,527 and 5,467,407, hereby incorporated by reference. However, as will be understood, the present invention will operate with any type of recognizer, including a speech recognizer.

An AFind class is a "fuzzy" matching class (e.g., fuzzy matching is generally described in the aforementioned patent applications Ser. Nos. 09/643,617 and 10/177,480) to determine how many edits are needed to convert a query string to match a target string. If the cost is low enough, the words are considered a match.

To search closed notes, the search engine 920 (CSearch) is the class which contains the logic needed to create the background thread 950. The UI first calls Init, to provide the callbacks with which the search engine wants to be notified, and calls AddSearch for each of the searches the search engine 920 wants to perform. Generally these are the same target text, with different directories and filemasks. When the search engine 920 has set the desired searches, BeginThread is called on CSearc::SearchWorkerThreadProc. A DoSearch method crawls the file system, using a FindFirstFile method to find the files which match the file mask specified by the caller. The search engine 920 may also check to make sure that any file attributes (DATE&TTME) are within the parameters required by the search. If so, then a comparison is done to see if the file name contains the required phrase or term. If it does, then the file is automatically considered a match, while if not, then a CSrchCore object is created to search the file's content. To this end, a CSearchlfilterDataProvider is created on the file to be searched, and if the search engine 920 returns a match, the result is passed to the UI, via the SearchCallback with which the search engine 920 was initialized.

When searching an open document (the current note), the ink layer text is searched first, before the recognized annotation data. These results are then ordered so that when the user navigates through the document via next/previous buttons or the like, the user sees the results highlighted in a logical order. In the example implementation, this ordering is performed by sorting the results by the upper left corner (coordinates) of each result's bounding box, (or another suitable set of coordinates, such as for right-to-left reading languages.)

In certain implementations, a problem may arise in that the coordinates returned by the background image layer may be different than those used by the richink. In such implementations, this problem may be solved by converting the background co-ordinates into richink document units, or otherwise normalizing the coordinate systems. However, this may need to be done when the page is currently on screen, whereby anytime that a result is displayed on a page that has not been previously displayed, the page is checked for unconverted results. If any are present the matches are converted, and the list of results re-sorted. This work may be performed in the UI code. In other implementations, such normalization is not needed.

Turning to an explanation of one such search engine 920, a preferred search engine uses logic generally based on technology in U.S. patent application Ser. Nos. 09/643,617, (filed Aug. 22, 2000) and 10/177,480 (filed Jun. 21, 2002), assigned to the assignee of the present invention, and hereby incorporated by reference. This logic is generally represented by the flow diagrams of FIGS. 11-13. As part of the search, as mentioned above, the search may be adjusted for certain types of recognizers/locales. For example, in some Japanese recognizers, every character is treated as a word unit, including any English-language characters that the recognizer recognizes. To handle such recognizers, the query string may be parsed differently, such as to be able to reparse the query when multiple languages are encountered in the same document.

Figure 11:
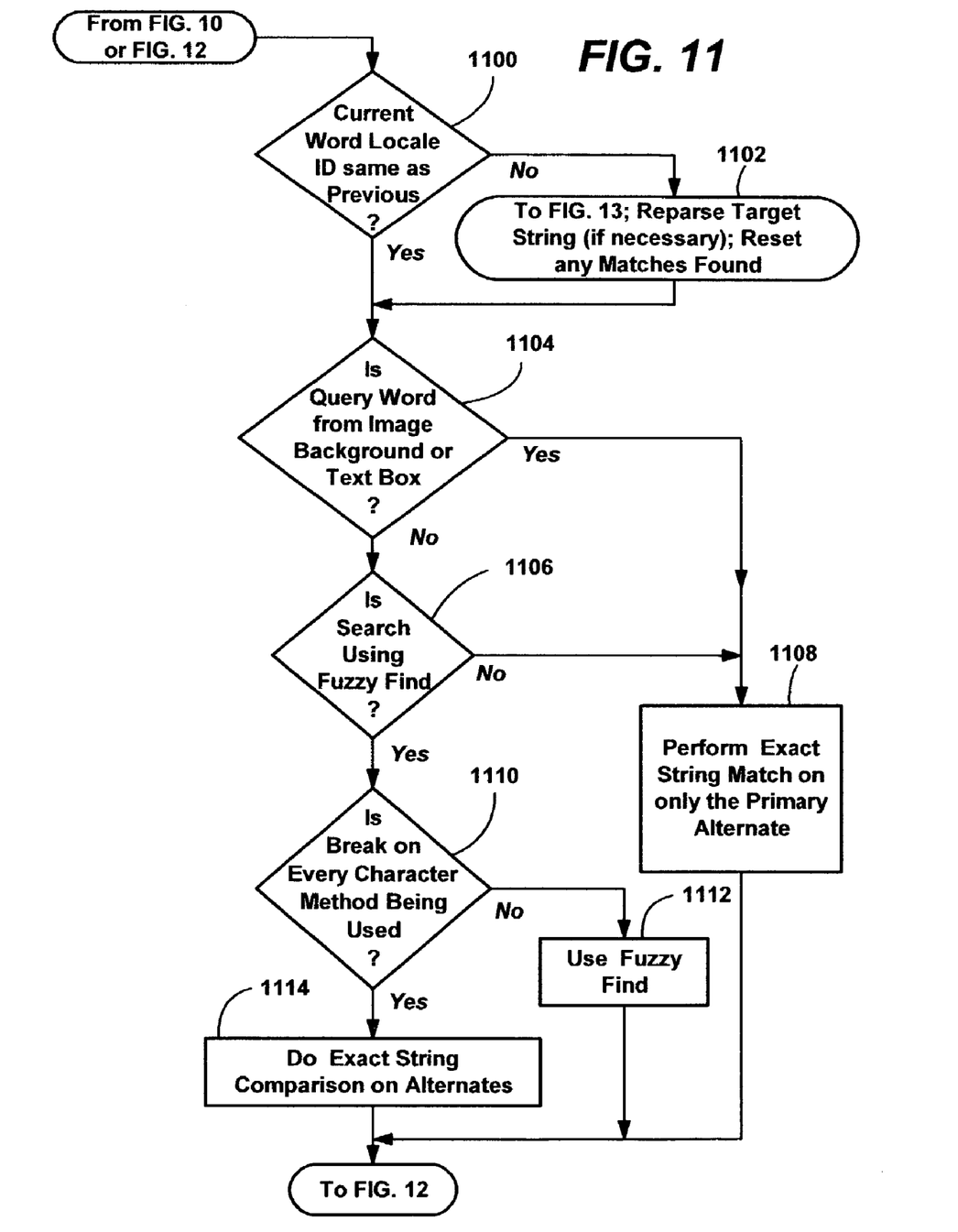
FIGS. 11-13 comprise a flow diagram generally describing how a document including annotated ink words may be searched for words and phrases, in accordance with one aspect of the present invention.

To this end, before each word is compared, at step 1100, a test may be performed to determine whether the word is from a different locale than the previous word. If so, a second test is performed (FIG. 13) to determine whether to re-parse the text the user is looking for. Step 1300 and 1302 of FIG. 13 evaluate the query string to determine if there is at least one character to search, returning an error at step 1304 if not. Note that this is possible, for example, if the user wants to perform a date-based or time-based search for all instances of data modified at a certain data or time, regardless of the text.

Figure 13:
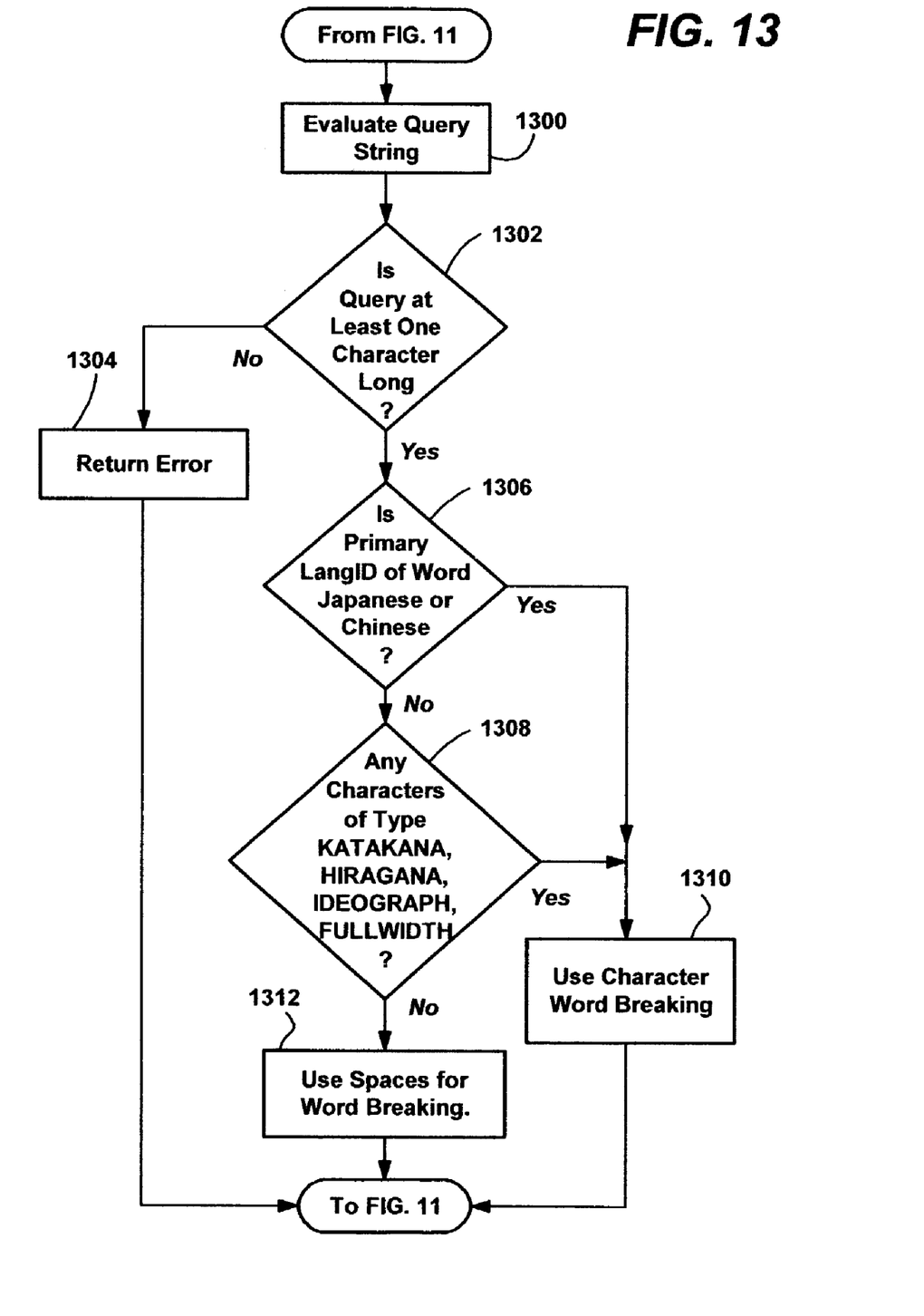

In situations where there is a string of text to be matched, step 1304 branches to step 1306 where the primary language identifier (present in the file data) of the word is evaluated. If the primary language identifier of the word is Japanese or Chinese (or other symbol-type language), via step 1306 or 1308 the characters themselves are treated as words for word-breaking purposes, via step 1310. Otherwise spaces are used for word breaking via step 1312.

Returning to FIG. 11, once the word breaking is determined, the search engine 920 may search for matches of words and phrases using an exact match or a fuzzy match, e.g., a test based on a percentage of matching characters for each word of a search term, or other similar fuzzy searches as generally described in the aforementioned patent applications Ser. Nos. 09/643,617 and 10/177,480. For words that are text (without recognized alternates), step 1104 branches to step 1108; for words of more than one character, such words are broken up into separate words. The query text is compared to the target text in the document on a per-word basis, whereby in order to produce correct matches, the query is broken up in the same way that the text is provided to the searching subsystem. Note that the interface, and/or search engine search may detect and eliminate duplicate words that are not really the same words consecutively in the text, but rather intended to be a single word displayed twice, once in a slightly offset manner, e.g., for shadowing purposes. However, this is likely detected when sorting, since the coordinates of each instance are available, and if the bounding boxes are too close, shadowing is detected and only one instance kept in the list.

For annotations input as handwritten text, the term or phrase is recognized as text, and may have alternates information returned for it. A search term comprising a phrase can have a mixture of typed text and handwritten input. As will be understood, in some of the tests, if the search term has handwritten input such that alternates are available, the search term's alternates information may be used in determining whether each word (or set of alphanumeric characters or the like that does not necessarily comprise a word) in a document matches, i.e., is considered a match according to various criteria. In general, if the search term word has alternates, the alternates may be used in testing. For such words, a fuzzy find may be specified, as tested for at step 1106. If not, an exact match searched is performed via step 1108. If so, step 1110 is executed, such that if the break on space method if being used, step 1110 branches to step 1112 where a fuzzy search is performed. If the break on every character method being used, step 1110 instead branches to step 1114 where an exact string comparison is performed, including on any alternates.

Figure 12:
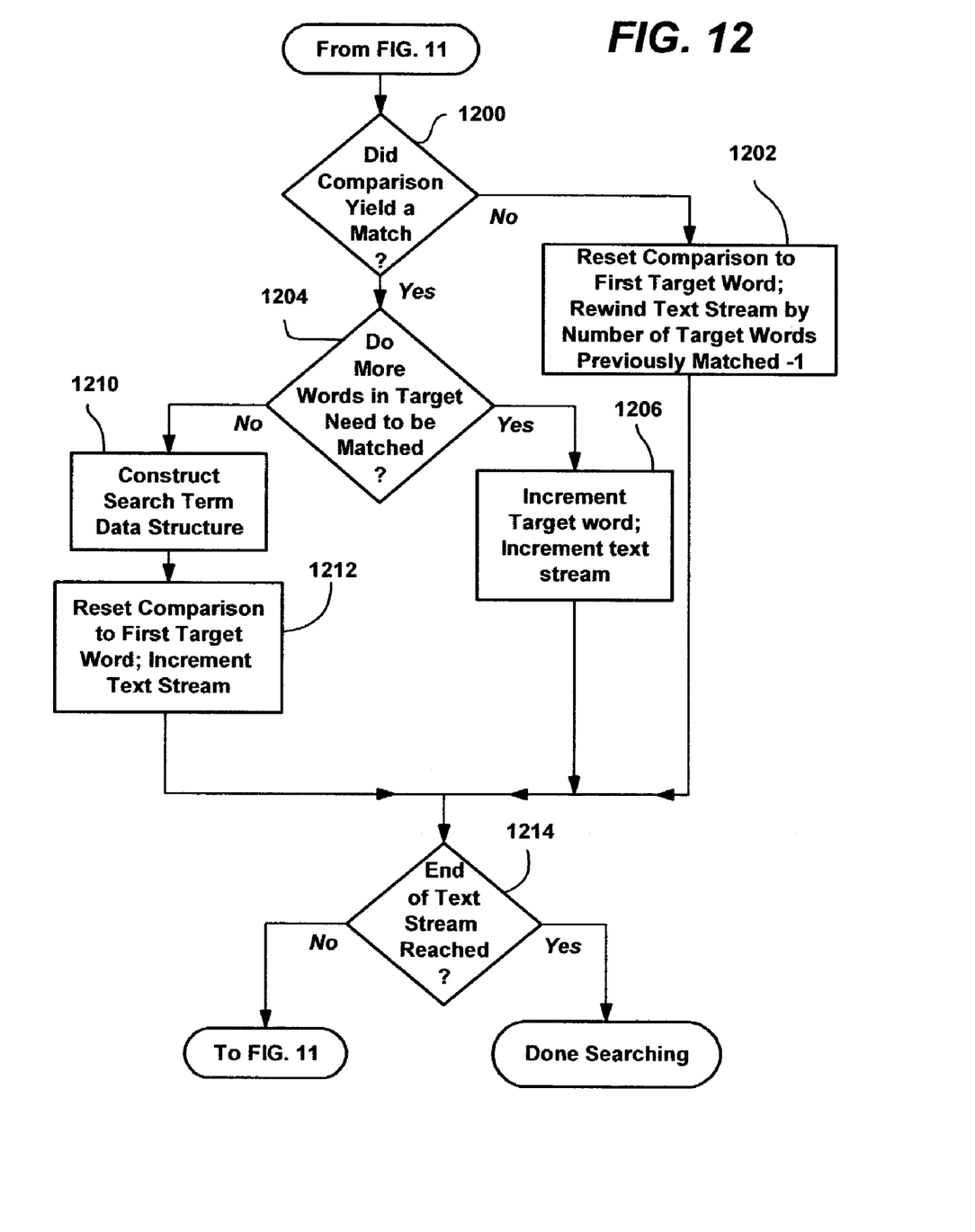

Following the word testing, step 1200 of FIG. 12 represents the determination of whether a match was found. If so, step 1200 advances to step 1204 to evaluate whether the entire search term (word or phrase) was matched to a corresponding target word or phrase (of consecutive words) in the document or search file data. In general, when-evaluating a phrase, each time a word matches, the process advances to the next word in the search word stream and to the next word in the target word stream via step 1206, until either all search term words in the phrase were individually matched as determined by step 1200, or a non-match is detected.

If a complete search term match is detected at step 1204, step 1210 is executed to construct a suitable data structure (e.g., 230$_1$ of FIG. 2) as described above. The process continues to look for matches via steps 1212 and 1214, until step 1214 determines that the end of the text string has been reached.

Returning to step 1200, anytime that step 1200 detects that no match was found, the target stream is rewound back to where it was at the start of the phrase comparison, plus one target word, so that partial phrase matches will not cause potentially matching target words to be skipped. To this end, step 1202 is executed to rewind (e.g., moves a pointer to) the target word stream back to where it was at the start of the searching, whereby the next target word will be selected. The above process thus locates search terms comprising a single word or multiple word phrases that are present in an ink document.

As can be seen from the foregoing detailed description, there is provided a method and system that provide a new way of working with digital ink annotations, by making them as searchable as the underlying computer document, and improving the user experience of working with digital ink annotations and increasing the value and attraction of creating digital ink annotations.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A method of searching a document containing a content layer and at least one annotation layer, the method comprising:
   performing a search query upon the document containing both a content layer and at least one annotation layer, the search query comprising:
   searching within the content layer of the document for at least one match to the search query;
   searching within the annotation layer of the document for at least one match to the search query; and
   the searching of both the content layer and the annotation layer of the document being enabled to search both text and ink;
   producing list of search result data structures by producing a search result data structure for each match of the search query, the data structure comprising information identifying whether the match occurred in the content layer or the annotation layer, the page number of the document, the spatial coordinates of the match, a bounding box of the match, and a pointer to the document;
   collating and reordering the list of search result data structures, by a sorting mechanism, into a logically ordered list; and
   returning a search result comprising at least one search result data structure based on the result of at least one of the search of the text portion of the document or the search of the annotation portion of the document, the search result including location information associated with at least one match within the document.

2. The method of claim 1 wherein searching the content layer of the document and searching the annotation layer of the document are directed to determining whether the file has a single instance of text that matches the search query, and wherein returning a result comprises returning a status for the entire document indicative of whether a single match to the search query was found or not found.

3. The method of claim 1 wherein searching the content layer of the document and searching the annotation layer of the document are directed to locating each instance of text that matches the search query, and returning the result comprises returning a data structure for each instance of text that matches the search query.

4. The method of claim 3 wherein a plurality of data structures are returned, wherein each data structure further comprises timing data, the timing data indicating when a user wrote a sequence of words, and wherein the method further comprises, sorting the search result data structures into an ordered list based at least in part on the timing data.

5. The method of claim 3 wherein a plurality of data structures are returned, wherein each data structure includes a page number and coordinate data, coordinate data comprising x and y coordinates representing a location on a page, and the method further comprising, sorting the search result data structures into an ordered list based at least in part on the page number and the x and y coordinate data.

6. The method of claim 5 wherein the search result data structures are sorted based first on their page number, then based on their y-coordinate data, and then based on their x-coordinate data.

7. The method of claim 6 wherein when the absolute value of the difference in the y-coordinates of two data structures is below a threshold, the y-coordinate data of the two data structures is considered the same.

8. The method of claim 3 wherein a plurality of search result data structures are returned based on annotations having a common author.

9. The method of claim 3 wherein a plurality of search result data structures are returned based on annotations having equivalent time data, the time data representing when a user wrote a sequence of words.

10. The method of claim 3 wherein a plurality of search result data structures are returned based on annotations having equivalent z-ordering data.

11. The method of claim 3 wherein a plurality of search result data structures are returned, and further comprising, arranging the data structures into a list, and walking the list in response to next or previous commands to locate an instance in response to each command.

12. The method of claim 1 further comprising, searching for at least one match to the search query in another portion of the document, and wherein the search result is further based at least in part on the result of the search of the another portion of the document.

13. The method of claim 1 wherein the annotation layer comprises annotated data that has been recognized as text.

14. The method of claim 1 wherein the annotation layer comprises annotated ink data, and further comprising, recognizing the annotated ink data as text.

15. The method of claim 1 wherein the text portion comprises text that has been recognized from ink data.

16. A computer-readable storage medium having computer-executable instructions encoded thereon which, when executed, perform the method of claim 1.

17. A system comprising:
   at least one interface,
      the interface enabled to accept data from both a document content layer and from a document annotation layer,
      the interface enabled to accept both text and ink data, and
      the interface further enabled to provide a text stream to a search engine in a common format regardless of whether the data to be searched originated within the document content layer or the document annotation layer;
   a search engine that receives the text stream from the interface, the search engine enabled to search both text content and digital ink content, searches the at least one content layer and the at least one annotation layer, and the search engine determining whether the document has at least one instance of a text match with a search query, and producing a search result data structure for each match of the search query, the data structure comprising information identifying whether the match occurred in the content layer or the annotation layer, the page number of the document, the spatial coordinates of the match, a bounding box of the match, and a pointer to the document; and
   a sorting mechanism enabled to collate and reorder the results of a search performed by the search engine.

18. The system of claim 17 further comprising an annotator program that annotates the document.

19. The system of claim 17 wherein the search engine generates a search result data structure for each instance of a text match.

20. The system of claim 19 wherein a plurality of search result data structures are generated, and further comprising a sorter that sorts the search result data structures into a logical order.

21. The system of claim 20 wherein each search result data structure includes timing data, the timing data indicating when a user wrote a sequence of words, and wherein the sorter sorts the data structures into an ordered list based at least in part on the timing data.

22. The system of claim 20 wherein each search result data structure includes x and y coordinate data and page number, and wherein the sorter sorts the data structures into an ordered list based at least in part on the page number and the x and y coordinate data.

23. The system of claim 22 wherein the search result data structures are sorted based first on their page number, then based on their y-coordinate data, and then based on their x-coordinate data.

24. The system of claim 23 wherein when the absolute value of the difference in the y-coordinates of two data structures is below a threshold, the y-coordinate data of the two data structures is considered the same.

25. The system of claim 19 wherein a plurality of search result data structures are returned based on annotations having a common author.

26. The system of claim 19 wherein a plurality of search result data structures are returned based on annotations having equivalent date and/or time data.

27. The system of claim 19 wherein a plurality of search result data structures are returned based on annotations having equivalent z-ordering data.

* * * * *